Nov. 30, 1954     I. S. ROBERTS     2,695,457
INTERNAL CALIPER FOR TUBING
Filed June 19, 1953     4 Sheets-Sheet 1
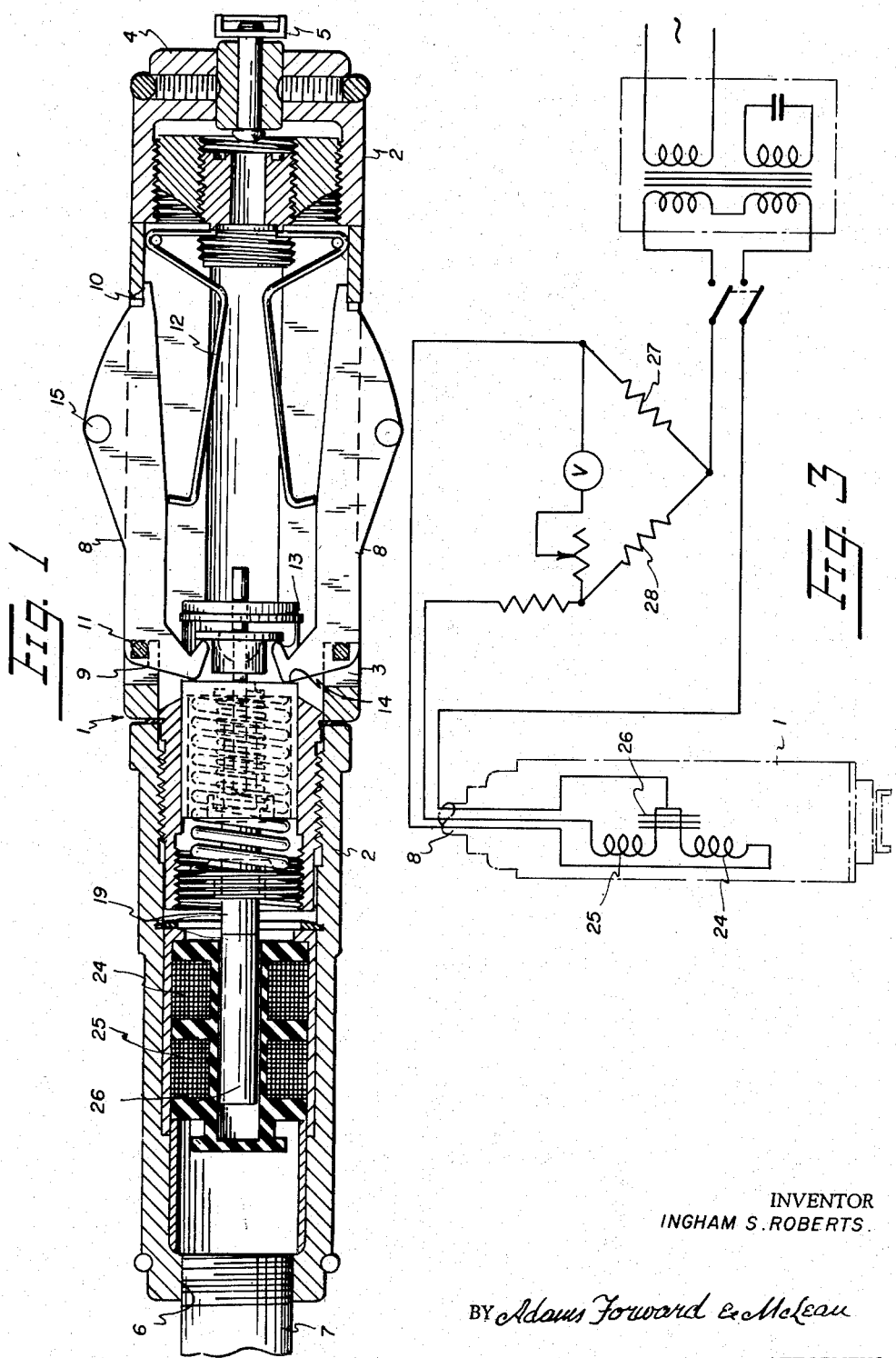
INVENTOR
INGHAM S. ROBERTS.
BY Adams Forward & McLean
ATTORNEYS

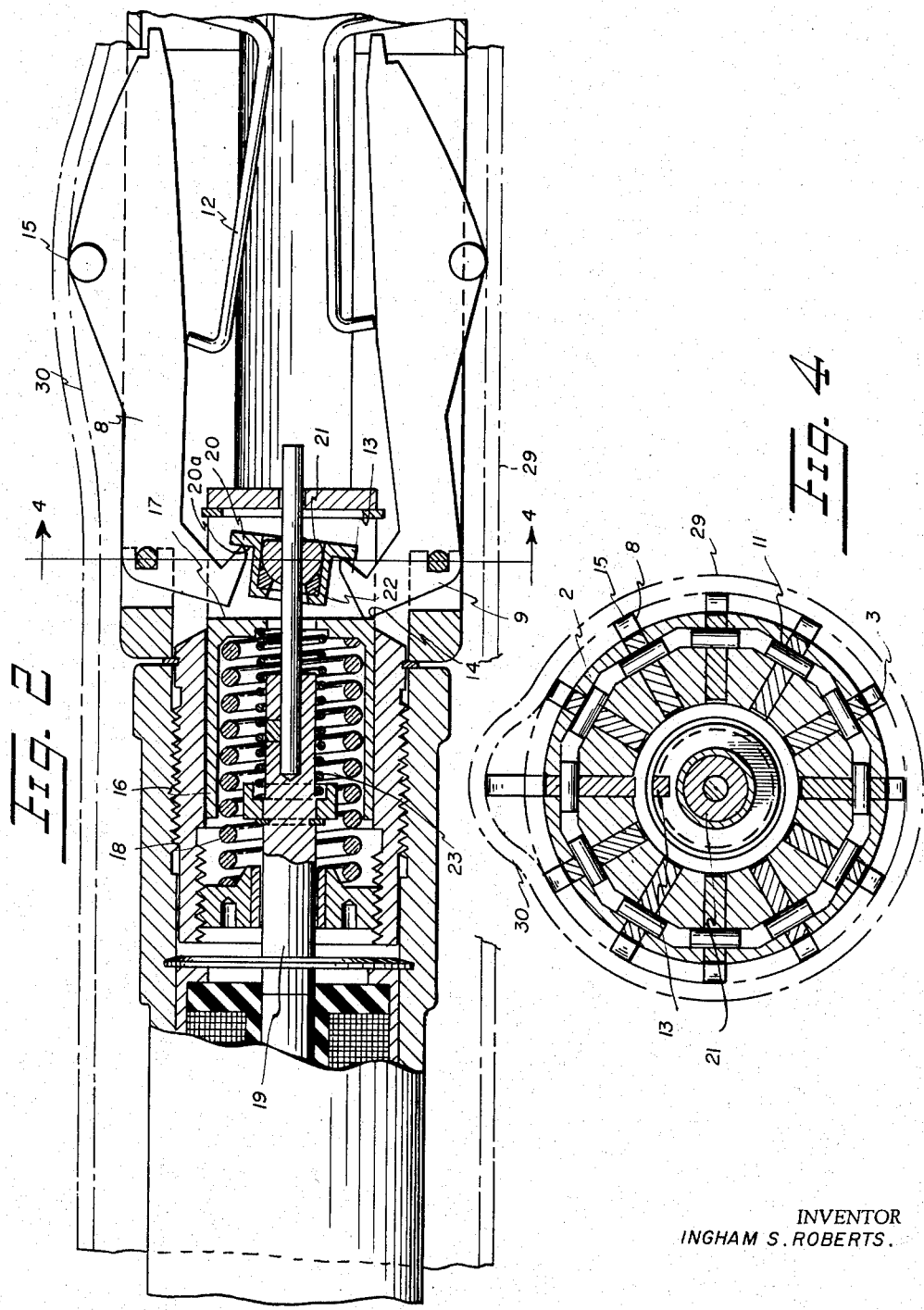

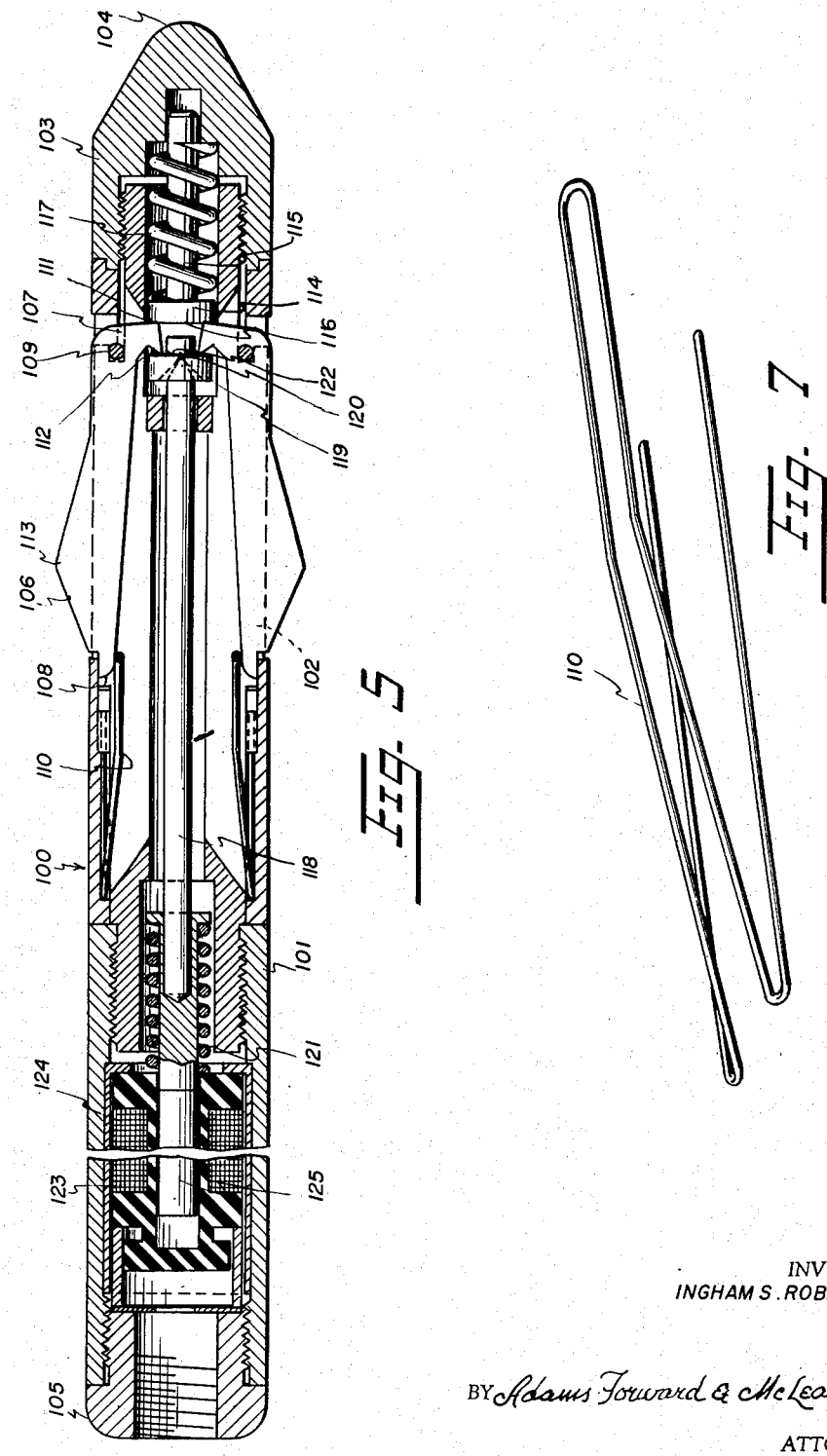

Nov. 30, 1954  I. S. ROBERTS  2,695,457
INTERNAL CALIPER FOR TUBING
Filed June 19, 1953  4 Sheets-Sheet 4

INVENTOR
INGHAM S. ROBERTS.

BY Adams Forward & McLean
ATTORNEYS

United States Patent Office 2,695,457
Patented Nov. 30, 1954

2,695,457

INTERNAL CALIPER FOR TUBING

Ingham S. Roberts, Ridley Park, Pa.

Application June 19, 1953, Serial No. 362,903

5 Claims. (Cl. 33—178)

This invention relates to the calipering of the internal transverse dimensions of long conduits and tubes by the passage therethrough of a measuring instrument or caliper. This invention provides an improved caliper particularly designed to provide a continuous and direct indication of the maximum internal transverse dimensions of such tubes and conduits. The caliper of this invention is capable of passage through horizontal, vertical, or inclined conduits and is particularly adapted to the measurement of elongated tubes of restricted diameter such as boiler tubes, oil well tubing, and the like.

It is contemplated that the caliper of this invention employ the electromagnetic type response mechanism of my U. S. Patent No. 2,235,533, patented March 18, 1941. It is further contemplated that the caliper of this invention can also be operated to give direct indication of the minimum internal transverse dimensions of conduits through which the instrument is passed by employing a dual electromagnetic response mechanism such as disclosed in my copending application Serial No. 192,550, filed October 27, 1950.

The caliper of this invention requires at least four radially extensible caliper fingers pivotally mounted at arcuate intervals about a measuring head which is adapted for passage through the conduit or tube to be measured. Each of the fingers is independently sprung to cause them when the caliper is passed through a conduit to seek contact with the internal walls of the conduit. The caliper also employs a centering means such as the centering means employed in my above noted copending application Serial No. 192,550 which, by the action of a heavy spring, selects the three caliper fingers which are least extended when the caliper is passed through a conduit and causes the measuring head to be centered in the circle determined by such three fingers, i. e. the centering means selects the three least extended fingers and by bearing equally against them causes them to be equally extended. It will be seen that the caliper when passed through a conduit of non-circular cross-section will be centered within the circle determined by the three least extended fingers, while the remaining finger, or fingers if more than four are employed, will be extended from the measuring head a greater distance.

The caliper also employs an axially slidable plunger having a bearing surface secured thereto by a universally pivotal connection. A spring sufficiently weak to avoid changing the position of the fingers is employed to bring the universally pivotable bearing surface into contact with the fingers in a direction from which contact is first made with the most extended finger and then as the plunger slides further toward the other fingers at least one other contact is made usually with the finger which is opposite the most extended finger. The contact of the pivotable bearing plate is thus in opposition to the action of the centering means. The pivotal connection of the bearing surface to the plunger is suitably achieved by a ball and socket arrangement, or by a needlepoint pivot when extremely small conduits are calipered.

In the drawings

Figure 1 represents a cross-sectional view of a caliper according to this invention;

Figure 2 is an enlarged fragmentary view of the moving parts of the same caliper illustrating more clearly the operative arrangement employed;

Figure 3 is an electrical wiring diagram showing a suitable connection for the caliper of Figures 1 and 2 by which the electromagnetic response system of my Patent No. 2,235,533 may be employed to give external indication of the position of the caliper fingers;

Figure 4 is a cross-sectional view of the caliper taken at line 4—4 of Figure 2;

Figure 5 is a sectional view of another caliper according to this invention which is particularly designed to measure the internal dimensions of small bore tubes;

Figure 7 is a perspective view of a spring employed in the caliper of Figures 5 and 6.

Figure 6:
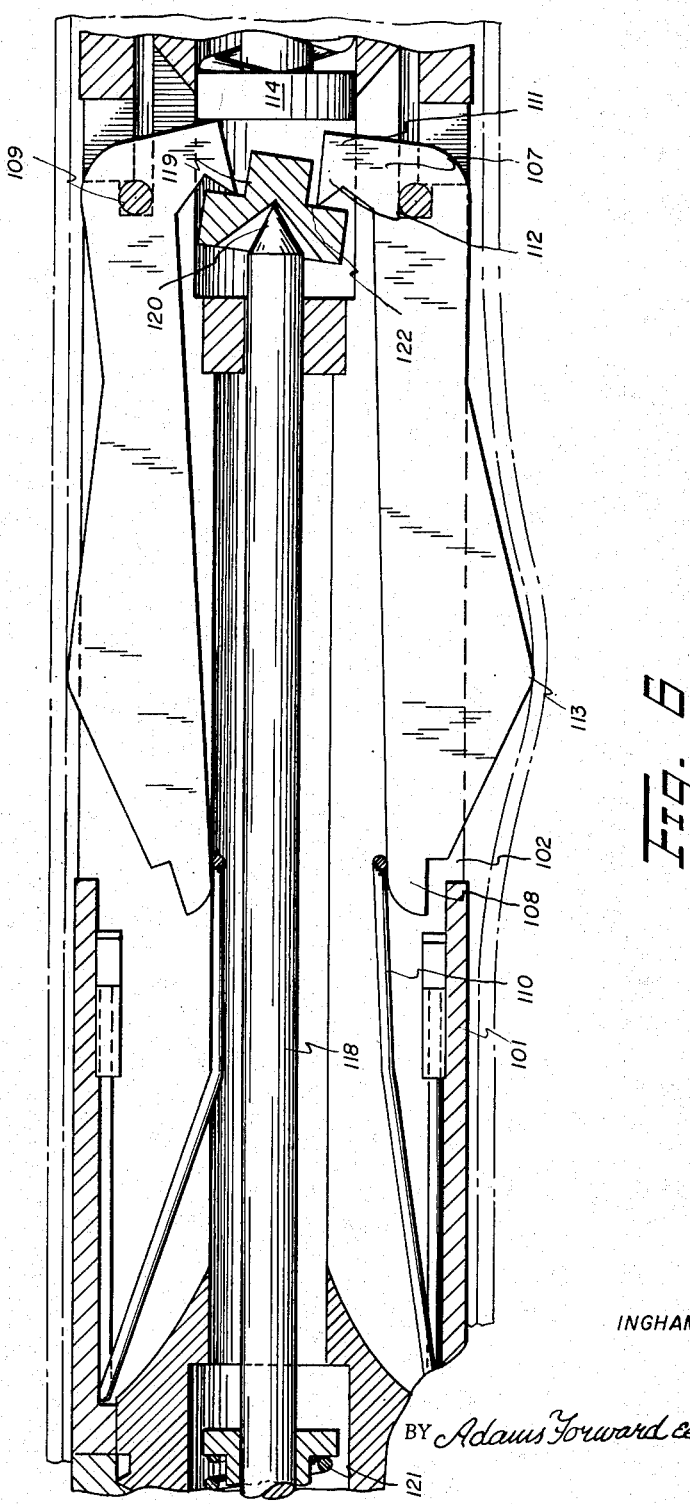
Figure 6 is an enlarged fragmentary sectional view of the moving parts of the caliper shown in Figure 5 illustrating more clearly the operative arrangement thereof.

Referring to Figure 1, caliper 1 includes a generally cylindrical casing or measuring head 2 having twelve longitudinally extended radial slots 3 spaced about the measuring head at equal arcuate intervals. Measuring head 2 is provided with a forward end plug 4 having shackle 5 mounted thereon to facilitate drawing caliper 1 through horizontal and inclined tubes. The other end of caliper 1 is provided with a socket 6 or other suitable connection for securing cable 7 through which electrical leads (not shown in Figure 1) may be passed to take electromagnetic response measurements at some external location.

Twelve caliper fingers 8 are mounted lengthwise in slots 3. Each finger 8 is provided with an inwardly extended arm 9. At the opposite end each finger is provided with a stop 10. Each caliper finger 8 is pivotally mounted within its associated slot 3 by pivotal connection 11 to measuring head 2. Pivotal connection 11, as shown in Figure 4, is positioned to permit caliper finger 8 to extend in a radial direction, that is, angularly in a plane which passes through the axis of the measuring head until stopped by contact of stop 10 with measuring head 2.

Each finger 8 is sprung outwardly by a bent spring 12 and each finger 8 is provided with a pair of bearing surfaces 13 and 14 on arm 9. Bearing surfaces 14 oppose the contact of outer edges 15 of fingers 8 with the wall of a conduit through which caliper 1 is designed to be passed while bearing surfaces 13 oppose the action of springs 12.

A cup-shaped plunger 16 (see Figure 2) is coaxially positioned and axially slidable within measuring head 2. Face 17 of cup-shaped plunger 16 is a bearing surface which by sliding motion of plunger 16 can be brought to bear against bearing surfaces 14 of the fingers 8 which are least extended. Heavy coil spring 18 is employed to force plunger 16 into such contact with bearing surfaces 14 of fingers 8.

An axially slidable plunger 19 is axially positioned within measuring head 2. Plunger 19 which passes through an axial hole in bearing face 17 has a bearing plate 20 fixed thereon in a ball 21 and socket 22 type universal connection. Weak coil spring 23 is employed to bring the bearing face 20a of plate 20 into contact with two or more of bearing surfaces 13 on arms 9.

Ideally, bearing plate 20 is pivoted about an imaginary point where the plane of face 20 passes through the axial center line of plunger 19. Better stability is obtained, however, by placing the pivot point slightly to the left of face 20 as shown in Figure 2. Such construction is a matter of design compromise and the displacement of the pivot point must be limited to avoid any significant error in the geometric relationship of the positions of caliper fingers 8 and plunger 9 which would exist if the pivot point were truly in the plane of bearing face 20.

The end of plunger 19 as shown in Figure 1 is operatively connected to indicate the relative axial displacement of plunger 19 with respect to measuring head 2 which is occasioned by the changes in positions of caliper fingers 8. Suitably a pair of adjacent coils 24 and 25 are each coaxially positioned within the measuring head 1. An extension 26 of plunger 19, formed of a magnetic material such as iron, is passed through the centers of coils 24 and 25 in such a manner that axial movement of extension 26 relative to coils 24 and 25 will produce opposing changes in the inductances of coils 24 and 25.

Figure 3 shows a suitable wiring connection for measuring such changes in the inductances of coils 24 and 25 by impressing an alternating current voltage through a series connection of an external impedance 27 and coil 24 in parallel with a series connection of an external impedance 28 and coil 25. A volt meter connected in parallel with coils 24 and 25 and in parallel with external impedances 27 and 28 by suitable calibration may be made to read directly the relative displacement of plunger 19 with respect to measuring head 2 in accordance with the principles explained in my aforenoted patent and copending application.

As caliper 1 is drawn through a conduit 29 (see Figure 2) fingers 8 are inwardly displaced by the internal dimensions of tube 29. Bearing surface 17 of cup plunger 16 by means of compression spring 18 is forced into contact with each bearing surface 14 causing all fingers to be extended equally so long as the internal cross-section of conduit 29 through which caliper 1 is passed is circular. At the same time, the face 20a of pivotable plate 20 is brought, by means of spring 23, into contact with all bearing surfaces 13.

When, however, the caliper reaches a bulge 30 as shown in Figures 2 and 3, one or more fingers 8 will be forced into the bulge by their individual springs 12. Since generally the shape of the tube remains circular, the caliper is retained centered by the position of the three or more fingers which are most depressed. The fingers, however, which are more extended by falling into the bulge no longer contact plate 17 with their bearing surface 14. At the same time contact plate 20 is moved by bearing surface 13 of the finger which is most extended into a position where it is out of contact with all other fingers, except the opposite finger 8 from that which is most extended, thus directly measuring the maximum diameter of the conduit. The ball 21 and socket 22 pivotal connection of plate 20 with plunger 19 permits plate 20 to assume an angular position with respect to the axis of the measuring head and the resulting change in position of plunger 19 produces a change in the position of magnetic extension 26 which movement in turn is detected in the external measuring circuit. A special case arises when there are two fingers in the category of most extended fingers. In this case plate 20 contacts bearing surfaces 13 of both such fingers and also contacts that finger or fingers which lies on the opposite side of the plate nearest the diameter of the plate bisecting the contact points with the most extended fingers. Other possible special cases of a similar nature can occur. In each such case, the pivotable nature of bearing plate 20 still provides a measurement of the maximum diameter of the conduit.

Figures 5, 6 and 7 show another caliper according to my invention which is particularly designed to measure the internal dimensions of tubes and conduits having relatively small bores.

Caliper 100 shown in Figures 5, 6 and 7 includes a generally cylindrical measuring head 101 having eight longitudinally extended radial slots 102 spaced about the measuring head at equal arcuate intervals. Measuring head 101 is provided with forward end plug 103 having a blunt nose 104 adapting the caliper to being dropped through vertical conduits. The other end of caliper 100 is provided with a socket 105 or other suitable connection for securing an electrical and supporting cable (not shown) through which pass the electrical leads by which electromagnetic response measurements are taken at some external location. Suitably the cable contains a steel wire core to provide sufficient strength to support the caliper.

Eight caliper fingers 106 are mounted lengthwise in slots 102. Each finger 106 is provided with an inwardly extending arm 107 at one end, and is provided with a stop 108 at its opposite end. Each caliper finger 106 is pivotally mounted within its associated slot 102 at its end from which arm 107 extends by pivotal connection 109 which is positioned to permit finger 106 to extend radially from caliper 100 until stopped by contact of stop 108 with casing 101.

Each finger 106 is sprung outwardly by a bent spring 110 (see Figure 7). Each finger 106 is provided with a pair of bearing surfaces 111 and 112 located on arm 107. Bearing surfaces 111 oppose the contact of outer edges 113 of fingers 106 with the wall of the conduit through which caliper 100 is designed to be passed, while bearing surfaces 112 oppose the action of springs 110.

Bearing plate 114, transversely positioned within caliper 100, is mounted on axially positioned and axially slidable plunger 115. Face 116 of plate 114 is brought to bear against bearing surfaces 111 of the fingers 106 which are least extended by means of heavy coil spring 117.

An axially slidable plunger 118 which is axially positioned within caliper 100 is connected to a second bearing plate 119 by a point pivot connection 120. Weak coil spring 121 is employed to bring the bearing face 122 of plate 119 into contact with two or more of bearing surfaces 112 on arms 107.

As in the case of bearing plate 20 shown in Figures 1 and 2, bearing plate 119 is pivoted about an imaginary point where the plane of face 122 passes through the axial center line of plunger 118. Better stability is obtained, however, by placing the pivot point 120 slightly to the right of face 122 as shown in Figures 5 and 6.

The rear end of plunger 118, as shown in Figure 5, is operatively connected to indicate the relative axial displacement of plunger 118 with reference to caliper 100 that is occasioned by changes in positions of caliper fingers 106. Suitably a pair of adjacent coils 123 and 124 are each coaxially positioned within caliper 100. An extension sleeve 125 of plunger 118 formed of a magnetic material such as iron is passed through the centers of coils 123 and 124 in such a manner that axial movement of extension 125 relative to coils 123 and 124 will produce opposing changes in the inductances of such coils.

The wiring arrangement of Figure 3 shows a suitable wiring connection for measuring such changes in the inductances of coils 123 and 124 simply by substituting such coils for coils 24 and 25 shown in Figure 3.

The operation of caliper 100 is similar to the operation of caliper 1 shown in Figures 1, 2 and 3, hereinabove described. The difference between caliper 100 and caliper 1 lies in the disposition of the operative parts and the universal joint employed. The operation of each caliper, however, is fundamentally the same.

I claim:

1. A tube caliper which comprises a measuring head, at least four radially extensible caliper fingers mounted at arcuate intervals about the measuring head, separate springing means urging each caliper finger to extend outwardly from the measuring head, centering springing means selectively causing the least extended caliper fingers to be equally extended, a universally pivotable bearing plate axially reciprocable within the measuring head and disposed to bear against the caliper fingers in opposition to the thrust of the centering means, springing means urging said pivotable bearing plate into bearing contact with said caliper fingers, and means operatively connected to the pivotable bearing plate for indicating the axial displacement thereof.

2. A tube caliper which comprises an elongated cylindrical measuring head, at least four longitudinally extended radial slots spaced at arcuate intervals about the surface of the measuring head, a caliper finger disposed in each slot lengthwise thereof, one end of each caliper finger being pivotally mounted to the measuring head to permit radial extension of the finger by angular movement in a plane passing through the axis of the measuring head, separate springing means urging each caliper finger to extend outwardly from the measuring head, an arm on each caliper finger extending inwardly of the pivotal connection thereof to the measuring head, a transverse bearing surface axially and slidably positioned within said measuring head disposed to bear against said arms to extend the caliper fingers radially from the measuring head, springing means urging said bearing surface into bearing engagement with at least three of said arms, a universally pivotable bearing plate axially reciprocable within the measuring head and disposed to bear against said arms in opposition to the thrust of said transverse bearing surface, springing means urging said pivotable bearing plate into bearing contact with said arms, and means operatively connected to the pivotable bearing plate for indicating the axial displacement thereof.

3. A tube caliper according to claim 2 in which the means operatively connected to the pivotable bearing plate for indicating the axial displacement thereof includes a plunger axially slidable within the measuring head and in which the pivotable bearing plate is secured to said plunger with a universal pivotal connection.

4. A tube caliper according to claim 2 in which the means operatively connected to the pivotable bearing plate for indicating the axial displacement thereof includes a plunger axially slidable within the measuring head and in which the pivotable bearing plate is secured to said plunger with a ball and socket connection.

5. A tube caliper according to claim 2 in which the means operatively connected to the pivotable bearing plate for indicating the axial displacement thereof includes a plunger axially slidable within the measuring head and in which the pivotable bearing plate is secured to said plunger with a point pivot connection.

References Cited in the file of this patent

UNITED STATES PATENTS

| Number | Name | Date |
| --- | --- | --- |
| 2,567,548 | Chaney et al. | Sept. 11, 1951 |
| 2,656,613 | Goble | Oct. 27, 1953 |

FOREIGN PATENTS

| Number | Country | Date |
| --- | --- | --- |
| 87,779 | Switzerland | Apr. 16, 1921 |